(12) United States Patent
Gorham et al.

(10) Patent No.: US 6,169,891 B1
(45) Date of Patent: Jan. 2, 2001

(54) METHOD AND APPARATUS FOR BILLING OF WIRELESS TELEPHONE CALLS

(75) Inventors: Peter C. Gorham, Chatham; Michael Edward McCarthy, Great Meadows; Sandip Mukerjee, Jackson; James A. Tavares, Eatontown, all of NJ (US)

(73) Assignee: AT&T Corp., New York, NY (US)

( * ) Notice: Under 35 U.S.C. 154(b), the term of this patent shall be extended for 0 days.

(21) Appl. No.: 09/298,853

(22) Filed: Apr. 26, 1999

Related U.S. Application Data

(62) Division of application No. 08/324,642, filed on Oct. 18, 1994.

(51) Int. Cl.$^7$ .................................................. H04M 11/00
(52) U.S. Cl. ......................... 455/408; 455/406; 455/410; 379/114; 379/144
(58) Field of Search ..................................... 455/405, 406, 455/407, 408, 409, 410, 411, 414, 422, 445; 379/111, 112, 113, 114, 133, 144; 380/247, 248, 271

(56) References Cited

U.S. PATENT DOCUMENTS

| 5,351,286 | 9/1994 | Nici ....................................... | 379/112 |
| 5,440,621 | 8/1995 | Castro ................................... | 379/114 |
| 5,473,671 | * 12/1995 | Partridge et al. ...................... | 455/445 |
| 5,557,664 | 9/1996 | Burns et al. .......................... | 379/114 |
| 5,579,379 | 11/1996 | D'Amico et al. ..................... | 379/112 |
| 5,602,907 | 2/1997 | Hata et al. ............................ | 379/111 |
| 5,826,185 | * 10/1998 | Wise et al. ............................ | 455/405 |
| 5,926,754 | * 7/1999 | Cirelli et aL. ........................ | 455/414 |
| 5,960,416 | * 9/1999 | Block .................................... | 379/114 |

OTHER PUBLICATIONS

"Calling Party Pays lowers airtime: Calling Party Pays provides subscriber flexibility customer satisfacation, and may increase carrier revenues (cellular subsribers pay only for calls they orginate)" *Cellular Marketing*, vol. 6, No. 6 p. 33 (Jun. 1991).

"Calling Party Pays" *Telephone Engineer & Management*, p. 10 (Oct. 1, 1993).

(List continued on next page.)

*Primary Examiner*—Nay Maung

(57) ABSTRACT

The airtime charge for a receiving wireless telephone station is assigned to an account that is not associated with the wireless telephone station receiving the call. For example, for a telephone call placed from a conventional home wired telephone station to a wireless telephone station, the airtime charge for the receiving wireless telephone station of the call is billed to the account associated with the home wired telephone station. In an exemplary embodiment of the invention, the airtime charge for a receiving wireless telephone station is transferred by a) receiving signaling from the caller that the airtime charge for the receiving wireless telephone station is to be billed to an account specified by the caller that is other than the account associated with the receiving wireless telephone station; b) marking the airtime charge record by the wireless telephone service provider serving the receiving wireless telephone station as one to be billed by another provider of telephone service; c) incorporating the wireless airtime charge of the receiving wireless telephone as part of the charges for the call billed by the other provider of telephone service to the account specified by the caller; and d) remitting the airtime charge collected from the other provider to the wireless telephone service provider. An indication of the transfer of the airtime charge is forwarded to the receiving wireless telephone station and a corresponding indication is supplied for the called party at the receiving wireless telephone station.

4 Claims, 5 Drawing Sheets

OTHER PUBLICATIONS

"Bills for Calls to Cellular Phones Surprise Customer" *RBOC Update,* vol. 4, No. 12 (Dec. 1993).

"Callers reaching cellular phones may be dialing for dollars US West Cellular: Market testing a 'calling party pays' option in Arizona and New Mexico" *Denver Business Journal,* p. 11 (Nov. 7, 1991).

"McCaw Cellular will introduce Calling Party Pays in test market in Idaho" *Common Carrier Week,* (May 31, 1993).

"Calling Party Pays" *Cellular Business,* vol. 5, No. 12, pp. 50–55 (Dec. 1988).

"McGraw Offers Calling Party Pays Feature in Boise Trial; Customers Now Have More Affordable Choices" *Businesswire* (May 27, 1993).

\* cited by examiner

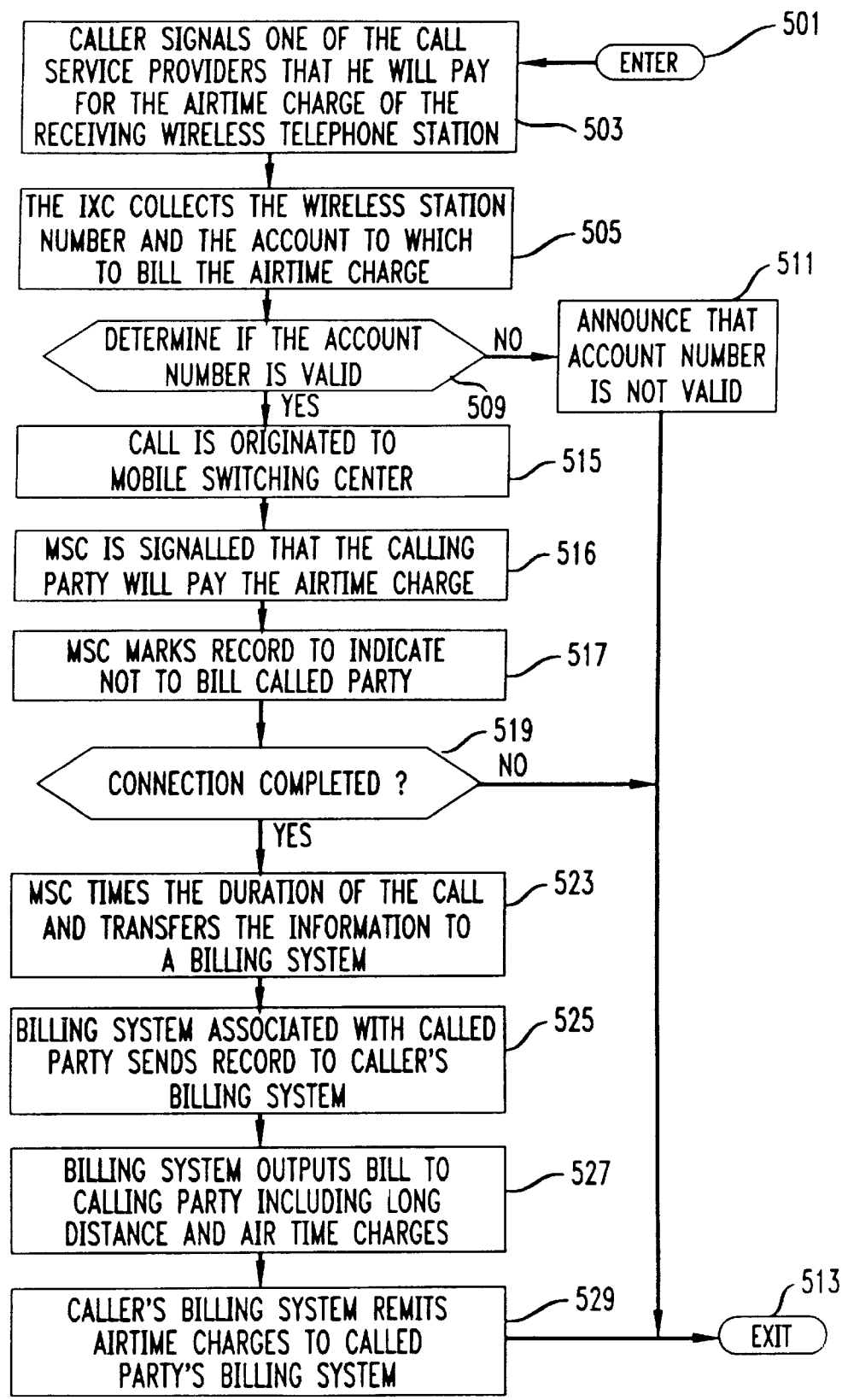

METHOD AND APPARATUS FOR BILLING OF WIRELESS TELEPHONE CALLS

This is a divisional of co-pending application Ser. No. 08/324,642 filed Oct. 18, 1994.

TECHNICAL FIELD

This invention relates to the billing of the charges for the wireless connection used by wireless telephone stations that are receiving wireless telephone calls.

BACKGROUND OF THE INVENTION

"Received-wireless" telephone calls, i.e., calls placed to a wireless telephone station and which may also have portions of its connections carried over conventional telephone facilities, both wired and wireless, have a component of the cost of the call known as the "airtime" charge for the receiving wireless telephone station. The "airtime" charge for the receiving wireless telephone station is the cost for use of the wireless channel that establishes the wireless telephone connection to the receiving wireless telephone station. At present, the airtime charge for the receiving wireless telephone station is always billed to the account associated with the wireless telephone station receiving the call. This is a major factor which deters people from freely giving out their mobile telephone numbers.

SUMMARY OF THE INVENTION

We have recognized that it is desirable to be able to transfer the airtime charge for the receiving wireless telephone station to an account other than the account associated with the wireless telephone station receiving the call. In accordance with the principles of the invention, the airtime charge for a receiving wireless telephone station is assigned to an account that is not associated with the wireless telephone station receiving the call. For example, for a telephone call placed from a conventional home wired telephone station to a wireless telephone station, the airtime charge for the receiving wireless telephone station of the call is billed to the account associated with the home wired telephone station. As another example, the airtime charge for a receiving wireless telephone station on a "receivedwireless" telephone call originated at a wired public telephone station is transferred and charged to the same "card" to which the land line charges for the telephone call are charged. As used herein, the term "card" refers to any type of credit card or credit account mechanism including, but not limited to: a) a telephone-companyissued card, such as the Bell Atlantic™. IQ Card, b) a combined commercial credit card and telephone card, such as the AT&T Universal Card, c) a commercial credit card, such as an American Express® card or a VISA® card, or d) a debit card.

In an exemplary embodiment of the invention, the airtime charge for a receiving wireless telephone station is transferred by a) receiving signaling from the caller that the airtime charge for the receiving wireless telephone station is to be billed to an account specified by the caller that is other than the account associated with the receiving wireless telephone station; b) marking the airtime charge record by the wireless telephone service provider serving the receiving wireless telephone station as one to be billed by another provider of telephone service; c) incorporating the wireless airtime charge of the receiving wireless telephone as part of the charges for the call billed by the other provider of telephone service to the account specified by the caller; and d) remitting the airtime charge collected from the other provider to the wireless telephone service provider.

In accordance with a feature of the invention, an indication that the airtime charge for the received wireless telephone station is being paid for by a party other than the called party is forwarded to the wireless telephone station and a corresponding indication is supplied for the called party at the receiving wireless telephone station. Advantageously, a wireless call recipient will be more likely to answer, and to talk longer on, a wireless telephone call for which the airtime charges are being paid by another party.

BRIEF DESCRIPTION OF THE DRAWING

In the drawing:

FIG. 5 shows, in flow chart form, another exemplary process for placing a call to a wireless telephone station and charging the airtime for the receiving wireless telephone station to an account that is not associated with the receiving wireless telephone station, in accordance with the principles of the invention.

DETAILED DESCRIPTION

By way of definition, as used herein, the term "card" refers to any type of credit card or credit account mechanism including, but not limited to: a) a telephone-company-issued card, such as the Bell Atlantic™ IQ Card, b) a combined commercial credit card and telephone card, such as the AT&T Universal Card, c) a commercial credit card, such as an American Express® (card or a VISA® card, or d) a debit card. A "card call" is a telephone call whose cost is charged to the account associated with a card. Other common ways of referring to a "card call" are: a) a call charged to a card, or b) a call charged to a card number. A "card number" is a multi-character string that identifies the account associated with a card. Since it is generally the card number that is required for entering into a transaction using the account associated with a card, card issuers, i.e., the providers of the credit for each card, must provide a card holder with the card number but need not provide the card holder with a physical object that represents the card, e.g., an embossed plastic card. To successfully complete a card call, the caller may be required to supply a personal identification number (PIN) that is separate from the card number.

Figure 1:
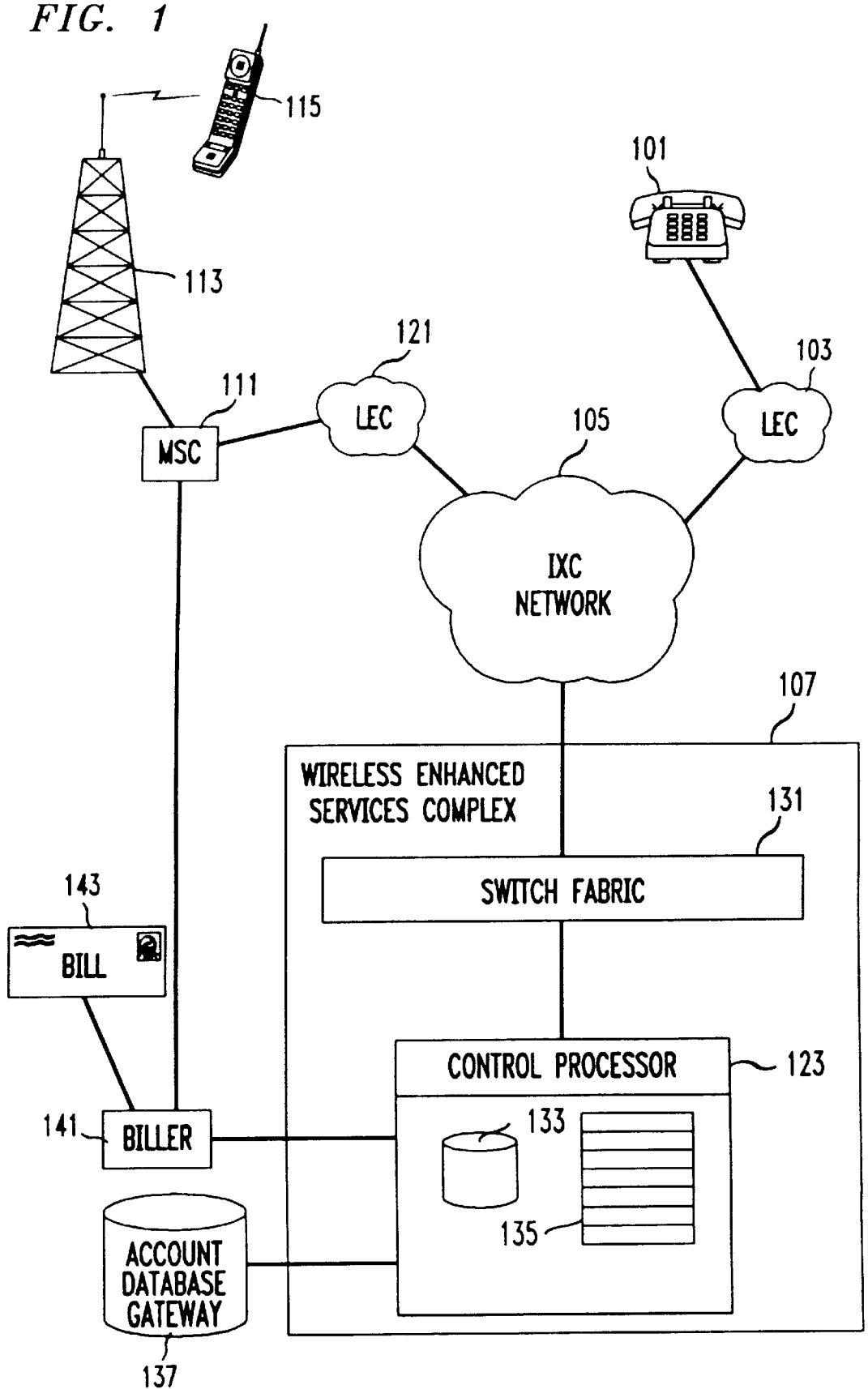
FIG. 1 shows an overview of a communication system for placing calls to wireless telephone stations in which the airtime charge for the receiving wireless telephone station is charged to an account that is not associated with the receiving wireless telephone station in accordance with the principles of the invention.

FIG. 1 shows an overview of a communication system for placing calls to wireless telephone stations in which the airtime charge for the receiving wireless telephone station is charged to an account that is not associated with the receiving wireless telephone station, in accordance with the principles of the invention. The system of FIG. 1 includes a) wired telephone station 101, b) local exchange carriers (LECs) 103 and 121, c) interexchange carrier (IXC) 105, d) wireless enhanced services complex (WESC) 107, e) mobile switching center (MSC) 111, f) mobile base antenna tower 113, h) wireless telephone station 115, i) biller 141, and j) account database gateway 137.

Wired telephone station 101 is connected to LEC 103 via a telephone line. LECs 103 and 121 are employed in the conventional manner to achieve connections to IXC network 105. It is noted that LECs 103 and 121 may be the same. IXC network 105 is employed to establish connections from wireless telephone 115 and wired telephone station 101 to wireless enhanced services complex 107. Wireless enhanced services complex 107 may be thought of as being located "in" or "behind" IXC network 105 as those terms are conventionally used in the art. MSC 111 is used to establish mobile telephone communications with wireless telephone 115 via mobile base antenna tower 113.

MSC 111 is preprogrammed to recognize the mobile identification numbers (MINs), e.g. the telephone numbers, of wireless telephone stations that are served by wireless enhanced services complex 107 and for which the features of the invention may be implemented.

Wireless enhanced services complex 107 includes control processor 123 and switch fabric 131. Control processor 123 provides all the computational capability necessary to control the overall operation of wireless enhanced services complex 107. Control processor 123 contains memory 133 and code 135. Memory 133 is used to store billing information, and, optionally, a list of wireless telephones, e.g., specified by MIN, that can be called and for which airtime charges when they are receiving wireless telephone calls may be charged to the caller. Code 135 is used to store the computer instructions which operate control processor 123. Switch fabric 131 can connect together, i.e., bridge, two telephone lines from IXC network 105. It establishes connections in response to commands from control processor 123.

Figure 2:
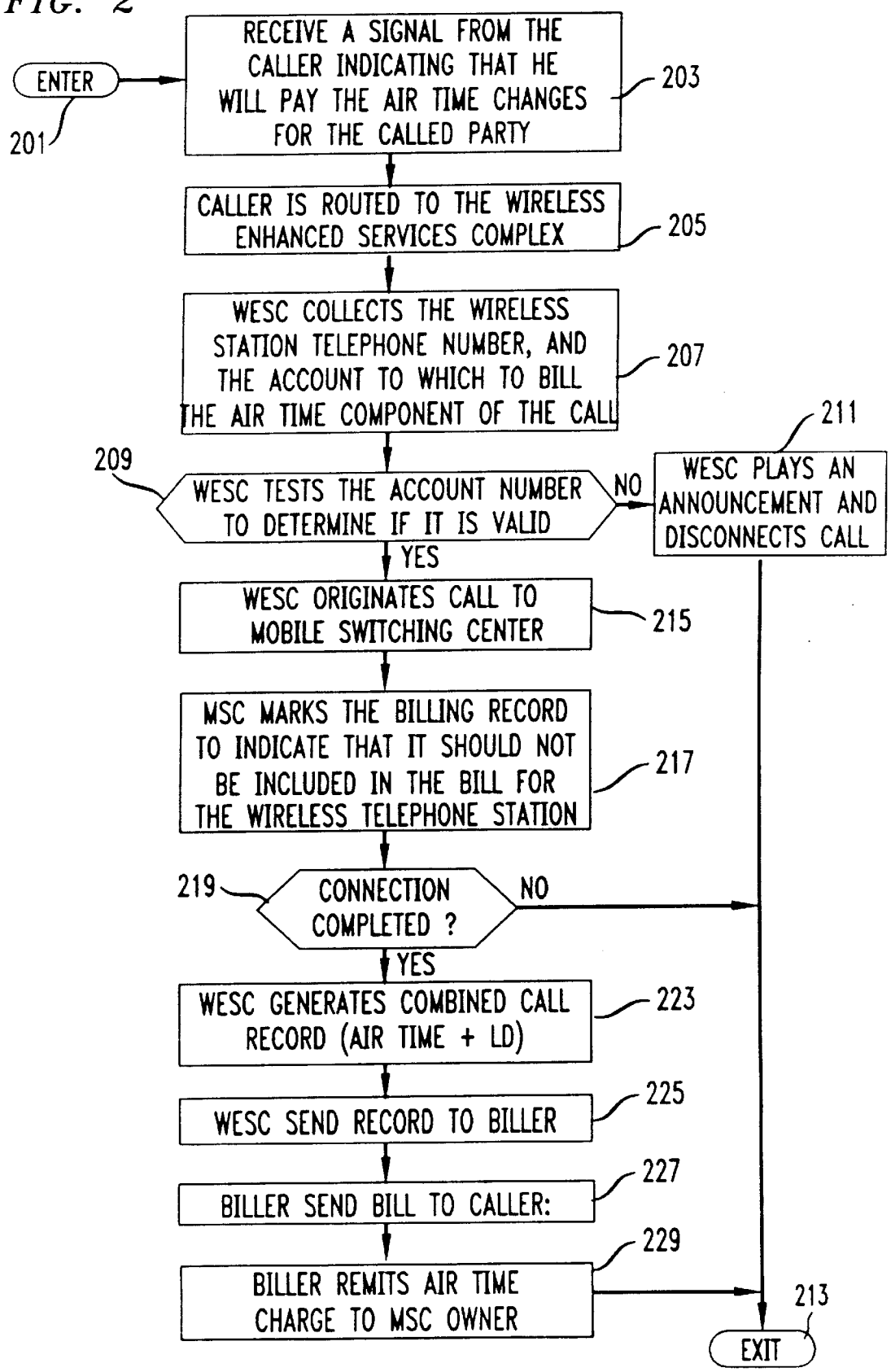
FIG. 2 shows, in flow chart form, an exemplary process for placing a call to a wireless telephone station and charging the airtime for the receiving wireless telephone station to an account that is not associated with the receiving wireless telephone station, in accordance with the principles of the invention.

FIG. 2 shows, in flow chart form, an exemplary process for placing a call to wireless telephone station 115 and charging the airtime for receiving wireless telephone station 115 to an account that is not associated with wireless telephone station 115, in accordance with the principles of the invention. The accounts to which the airtime charge for wireless telephone station 115 may be charged are, for example, the account associated with wired telephone station 101, a card account, or a third party telephone number supplied by the caller. The process is entered in step 201 when the caller goes off hook, e.g., at telephone station 101, to place a call. Next, in step 203, a code dialed by the caller to signal that he wishes to make a call to a wireless telephone and that he is willing to pay for the call recipient's airtime charges is received by LEC 103. For example, the signaling that the caller is willing to pay for the recipient's airtime charges may be the accessing of wireless enhanced services complex (WESC) 107 by the caller dialing a special access telephone number. Other exemplary signaling methods include having the caller dial a) an access code or b) a feature service code. The caller may also transmit a data signal to LEC 103, e.g., via ISDN D-channel. The caller's telephone may also be presubscribed to utilize the recipient airtime billing feature.

In step 205, the caller's call is routed to wireless enhanced services complex (WESC) 107 via LEC 103 and IXC network 105. Wireless enhanced services complex (WESC) 107 collects a) the telephone number for the wireless telephone station to which the call is to be placed, e.g., wireless telephone station 115, and b) the account number to which the call charges, including the recipient's airtime charges, are to be billed, in step 207. The information may be collected from the caller employing any conventional technique, e.g., dual tone multi-frequency signals, voice recognition, or other data signals. Alternatively, the information may be prestored in wireless enhanced services complex (WESC) 107. The information may also be supplied by either IXC network 105 or LEC 103. The receipt by wireless enhanced services complex (WESC) 107 of the call and the information indicates to wireless enhanced services complex that the airtime charge for the destination telephone station, which is to receive the call, is to be charged to the indicated account Thereafter, in step 209, wireless enhanced services complex (WESC) 107 tests to determine if the account number supplied is valid. This is done by transmitting a query to, and receiving a response from, account database gateway 137. Account database gateway 137 has data connections for forwarding queries to the proper account providers as to whether particular account numbers are valid and for supplying the responses to wireless enhanced services complex WESC 107. For an exemplary account database gateway for cards, see U.S. Pat. No. 5,287,403 issued to Atkins et al.

If the test result in step 209 is NO, i.e., indicating that the account number supplied by the caller is invalid, control passes to step 211, in which wireless enhanced services complex (WESC) 107 supplies an announcement to the caller that the account number supplied is invalid. Connection of the call is denied and the process then exits in step 213.

If the test result in step 209 is YES, i.e., indicating that the account number supplied by the caller is valid, control passes to step 215, in which wireless enhanced services complex (WESC) 107 originates a call to the mobile switching center (MSC), e.g., MSC 113, serving the desired recipient wireless telephone station, and transmits thereto the telephone number of the desired recipient wireless telephone station. This may be done by simply placing the call to the telephone number of the desired recipient wireless telephone station. In step 217, in accordance with an aspect of the invention, the mobile switching center marks the billing record to indicate that it should not be included as part of the bill for the owner of the called wireless telephone station. This may be done in so-called "real time", e.g., on a call-by-call basis as the result of a signal received by the mobile switching center from wireless enhanced services complex (WESC) 107. Alternatively, the mobile switching center may be preprovisioned to always mark the billing record in this manner for any calls placed to the telephone number of the called wireless telephone station.

Next, conditional branch point 219 tests to determine if the connection is completed, i.e., the called party at the receiving wireless telephone answers the call while the calling party remains on the call. If the test result in step 219 is NO, the process is exited in step 213. If the test result in step 219 is YES, control passes to step 223, in which, in accordance with an aspect of the invention, wireless enhanced services complex (WESC) 107 times the duration of the call and, at the end thereof, generates a call record that includes a combination of a) the receiving wireless telephone's airtime charges as well as b) the charges incurred by the calling party that are to be billed by the provider of wireless enhanced services complex (WESC) 107. The charges incurred by the calling party that are to be billed by the provider of wireless enhanced services complex (WESC) 107 include, for example, long distance charges and local wireline access charges.

In step 225, wireless enhanced services complex (WESC) 107 transmits the combined call record to biller 141. Biller 141, in turn, generates bill 143, which is transmitted to the caller, e.g., using mail or electronic billing, in step 227. As is well known, biller 141 may aggregate several calls over a predetermined time period prior to generating a bill for a particular caller. In step 229, biller 141 remits the amount of the airtime charge for the call to the airtime service provider, e.g., the owner of MSC 111. The process is then exited in step 213.

Figure 3:
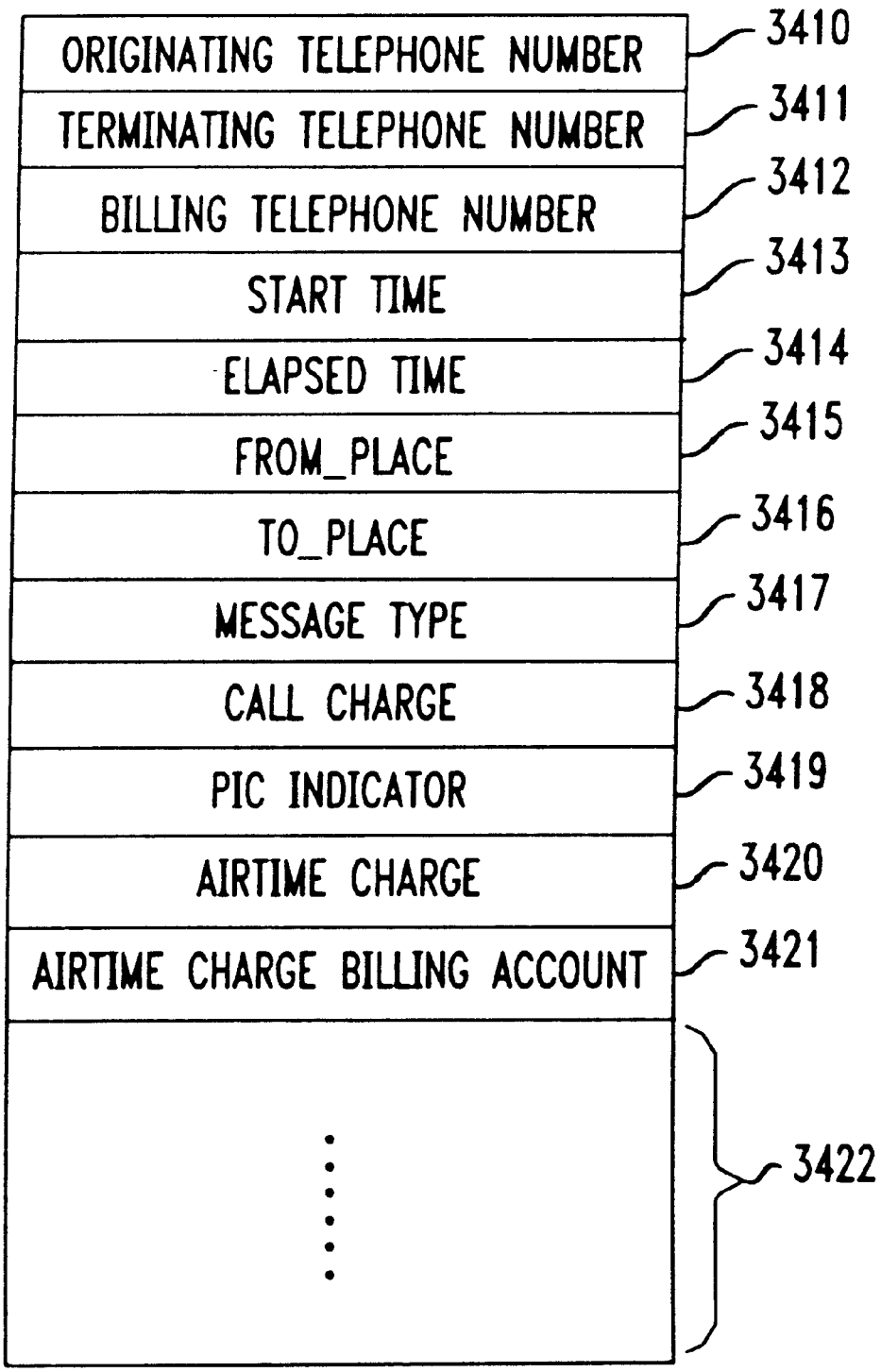
FIG. 3 shows a conceptual representation of billing record.

FIG. 3 shows a conceptual representation of billing record 301, some of the fields of which are filled by wireless enhanced services complex (WESC) 107 and others of which are filled in by biller 141. The fields, as shown, are arranged for pedagogic convenience and not necessarily in an order that is actually used. Some of the more significant fields of the billing record are a) the originating telephone number 3410 (i.e., the telephone number of the originating subscriber); b) the terminating telephone number 3411 (i.e., the telephone number of the receiving wireless telephone subscriber); c) the billing number 3412, which is typically empty but may be some number as, for example, when a card or third party telephone number is used to pay for the call; d) the start time for the call 3413; e) the elapsed time 3414, i.e., the duration of the call; f) the geographic call origination and termination points, e.g. Highland Park, N.J. and San Francisco, Calif., denoted as FROM_PLACE 3415 and TO_PLACE 3416; g) message type 3417, which indicates that the call was, for example, a direct-dialed domestic call, an operator-assisted international call, etc.; h) call charge 3418, which is the basic call cost for the call computed as a function of various ones of the message characteristics recorded in the billing message such as described above; i) PIC indicator 3419; j) airtime charge 3420, which is the airtime charge due for the call; k) airtime charge billing account 3421, which is used to mark accounts for the billing of airtime charges to an account other than that at the receiving wireless telephone; and l) various other data fields denoted as 3422.

Figure 4:
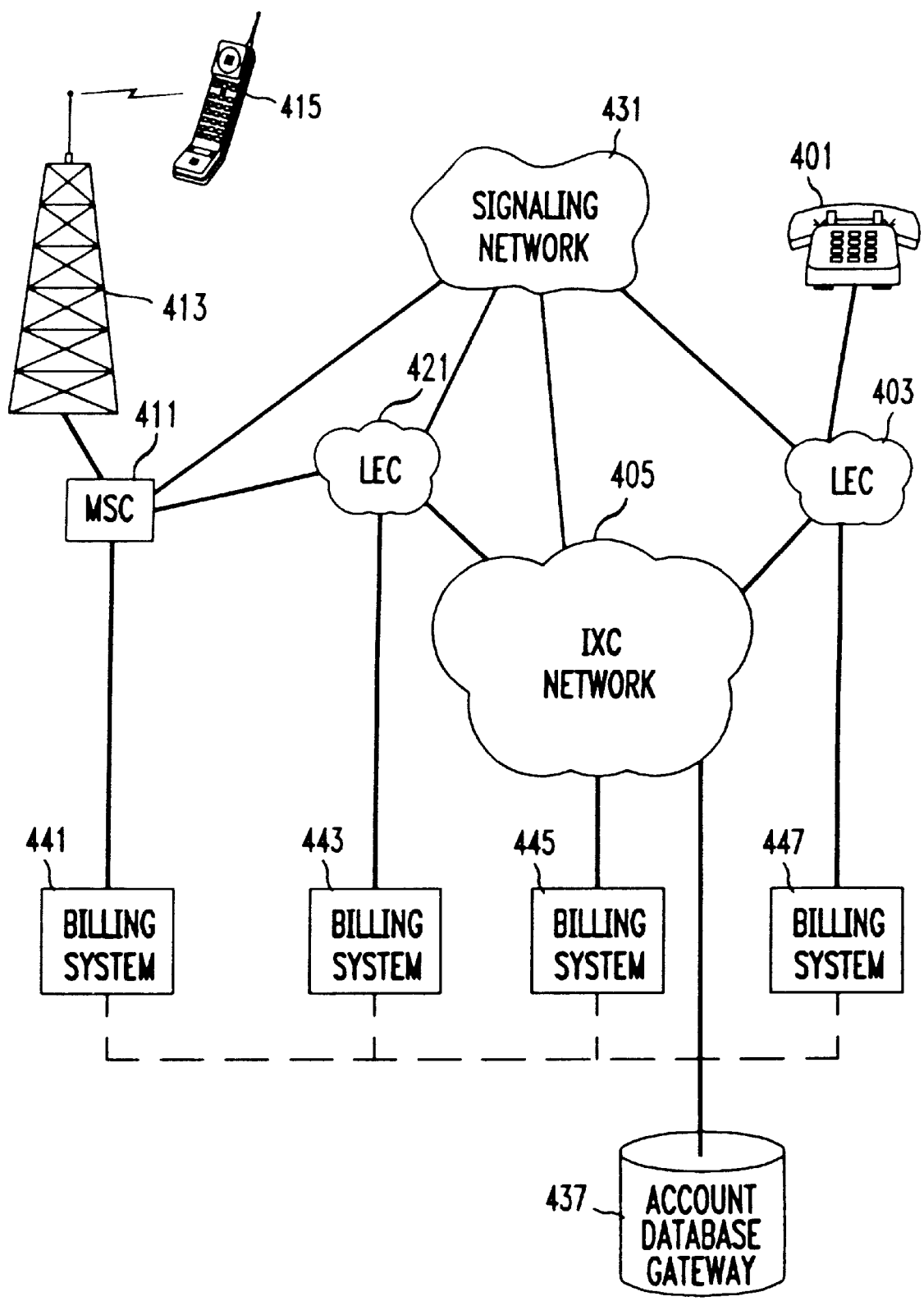
FIG. 4 shows an overview of another embodiment of a communication system for placing calls in which the airtime charge of the receiving wireless telephone station is charged to an account that is not associated with the receiving wireless telephone station in accordance with the principles of the invention.

FIG. 4 shows an overview of another embodiment of a communication system for placing calls in which the airtime charge of the receiving wireless telephone station are charged to an account that is not associated with the receiving wireless telephone station, in accordance with the principles of the invention. The system of FIG. 4 includes a) wired telephone station 401, b) local exchange carriers (LECs) 403 and 421, c) interexchange carrier (IXC) 405, d) mobile switching center (MSC) 411, e) mobile base antenna tower 413, f) wireless telephone station 415, g) signaling network 431, h) billers 441, 443, 445 and 447, and i) account database gateway 437.

Wired telephone station 401 is connected to LEC 403 via a telephone line. LECs 403 and 421 are employed in the conventional manner to achieve connections to IXC network 405. It is noted that LECs 403 and 421 may be the same. IXC network 405 is employed to complete long distance telephone connections. MSC 411 is used to establish mobile telephone communications with wireless telephone 415 via mobile base antenna tower 413.

Billing systems 441, 443, 445 and 447 may each develop charges for at least one portion of a call. Each of the billing systems need not be employed on every call. For example, on long distance calls billing system 445 associated with IXC network 405 is responsible for billing the land line charges by itself. Later remittance of access charges by the IXC to the LECs are performed independent of the billing of the billing system, albeit using the same call detail information from which billing records are derived. Thus, billing systems 443 and 447 are not activated for such calls. It is noted that one or more of the billing systems may be the same.

For calls placed from wired telephone station 401 to wireless telephone station 415 and for which the airtime charge for receiving wireless telephone station 415 are to be charged to the calling party, in accordance with the principles of the invention, the calling party signals at least one entity responsible for billing a portion of the call directly to the calling party, e.g., IXC network 405, that the calling party will pay for the airtime charge for the receiving wireless telephone station. For example, to signal that the caller is willing to pay for the airtime charge of the receiving wireless telephone station the caller may dial a) an access code or b) a feature service code. Other methods, noted above, may also be used.

The caller may also supply an account number to use for the billing of the call and the airtime charge of the receiving wireless telephone station if it is different than the account associated with the calling telephone number, e.g., a card number or third party number may be supplied. In response to the caller's signal, IXC network 405 performs a credit validation to determine if it will allow the caller to place the call and pay for the receiving wireless telephone station's airtime charge. As noted above, methods for performing such credit validation are well known.

If the supplied account number is valid, IXC network 405 transmits a message to MSC 411, e.g., via signaling network 431, indicating that the calling party has agreed to pay for the receiving wireless telephone station's airtime charge and that, therefore, MSC 411 is to transmit its resulting bill, generated by billing system 441, to billing system 445 associated with IXC network 405, in accordance with an aspect of the invention. As a result, MSC 411 causes a mark that indicates the airtime charge for the call is to be transmitted for collection to billing system 445 to be made by billing system 441 in the billing record that is opened for the call. Likewise, IXC network 405 instructs billing system 445 that it is to receive a billing record including the airtime charge for the receiving wireless telephone station from the billing system for MSC 411 and that the airtime charge is to be combined with the calling party's other charges. Billing system 445 may mark the record of the call to this effect.

Billing system 445 determines and/or collects and sums all the charges for which the IXC is responsible for collecting from the called party. Thus, for example, billing system 445 determines the long distance portion of the caller's call and it receives from billing system 441 an indication of the charge for the receiving wireless telephone station's airtime. Billing system 445 then generates a single bill containing both charges for the calling subscriber.

FIG. 5 shows, in flow chart form, an exemplary process, in accordance with the principles of the invention, for placing a call to wireless telephone station 415 and charging the airtime for wireless telephone station 415 to an account that is not associated with wireless telephone station 415. The flow is described for the embodiment of the invention shown in FIG. 4. The accounts to which the airtime charge for wireless telephone station 415 may be charged are, for example, the account associated with wired telephone station 401, a card account or a third party telephone number supplied by the caller.

The process is entered in step 501 when the caller goes off hook on telephone station 401 to place a call. Next, in step 503, the caller signals one of the call service providers that is responsible for billing the call to the caller, e.g., IXC network 405, that he wishes to make a call to a wireless telephone and that he is willing to pay for the airtime charge of the receiving wireless telephone station. In step 505, IXC 405 collects a) the telephone number of the wireless telephone station receiving the call and b) an indication of the account to which to bill the airtime charge for the wireless telephone station. The account may be indicated by default. The information is collected employing any available technique, such as those noted above.

In step 509, IXC 405 tests to determine if the supplied account number is valid. If the test result in step 509 is NO, i.e., indicating that the account number supplied by the caller for charging thereto the airtime charge for the receiving wireless telephone station is invalid, control passes to step 511, in which IXC 405 announces to the caller that the supplied account number is invalid. The process then exits in step 513. If the test result in step 509 is YES, i.e., indicating that the account number supplied by the caller for charging thereto the airtime charge for the receiving wireless telephone station is valid, control passes to step 515, in which IXC 405 originates a call to the mobile switching center (MSC), e.g. MSC 411, serving the wireless telephone station that is to receive the call.

In step 516, as part of the calling information transferred in establishing the call, IXC 405 transmits over signaling network 531 to MSC 411 a) the telephone number of the wireless telephone station receiving the call e.g., wireless telephone station 415, and b) an indication that the calling party will pay for the airtime charge for the connection to the receiving wireless telephone station, in accordance with the principles of the invention. In step 517, MSC 411 causes billing system 441 to mark the billing record for the airtime charge for receiving wireless telephone station 415 to indicate it should not be included as part of the bill generated by billing system 441 for the owner of receiving wireless telephone station 415. One exemplary method for marking the billing record is to enter into airtime charges billing account 3421 an identifier corresponding to the carrier that is to be responsible for collecting the airtime charge for the receiving wireless telephone station. Another method is to enter into airtime charges billing account 3421 the telephone number of the calling party. Any other indication with meaning to billing system 441 may be used.

Next, conditional branch point 519 tests to determine if the connection is completed, i.e., the called party at receiving wireless station 415 answers the call while the calling party at wired telephone station 401 remains on the call. If the test result in step 519 is NO, the process is exited in step 513. If the test result in step 519 is YES, control passes to step 523, in which MSC 411 times the duration of the call and transmits the call information to billing system 441, which updates the marked billing record for the receiving wireless telephone station's airtime charge. In step 525, billing system 441 1) determines that the billing record is marked and 2) transmits the billing record information to billing system 445. Next, in step 527 billing system 445 outputs a bill for the calling party, the bill including charges for both a) the long distance portion of the call and b) the receiving wireless telephone's airtime charge. As is well known, biller 441 may aggregate several calls over a predetermined time period prior to generating a bill for a particular caller. Billing system 445 remits the airtime charge to billing system 441 in step 529. The process then exits in step 513.

In another embodiment of the invention, instead of MSC 411 and billing system 441 being involved in producing the airtime charge, such task is delegated to IXC network 405 and billing system 445.

In accordance with a feature of the invention, a signal may be supplied to the receiving wireless telephone station indicating that the calling party has agreed to pay for the airtime charge for the receiving wireless telephone station. In an exemplary embodiment of the invention, such a signal would be supplied from MSC 111 or MSC 411. This signal may be any conventional distinguishable signal and it may be transmitted prior to, simultaneously with or after the called party answers the call. The signal may be manifested at the wireless telephone station audibly, visually or tactilely. Some exemplary manifestations include a distinctive ringing pattern, the lighting of an indicator such as an LED and the displaying of predetermined characters on a display, and a predetermined vibration pattern.

The foregoing merely illustrates the principles of the invention. It will thus be appreciated that those skilled in the art will be able to devise various arrangements which, although not explicitly described or shown herein, embody the principles of the invention and are thus within its spirit and scope.

What is claimed is:

1. A method for billing wireless telephone calls, the method comprising the steps of:

signaling a call service provider that a caller will pay for an airtime charge for a call to a wireless telephone station;

collecting a wireless telephone station number and a calling party account to be billed for the airtime charge for the call;

determining whether the calling party account is valid;

terminating the call when the calling party account is determined to be not valid;

accessing a mobile switching center when the calling party account is determined to be valid;

signaling a mobile switching center that the calling party will assume the airtime charge for the call;

marking a mobile switching center record to indicate that a called party account associated with the wireless telephone station is not to be billed;

completing connection of the call to the wireless telephone station;

timing a duration of the call;

transferring duration information for the call to the calling party account that is to be billed for the airtime charge;

sending the mobile switching center record to the calling party account that is to be billed for the airtime charge;

generating a bill for the caller that includes a long distance charge and the airtime charge; and remitting the airtime charge billed to a service provider providing wireless telephone service to the wireless telephone.

2. The method of claim 1, wherein signaling a mobile switching center further comprises:

supplying a signal to the wireless telephone station of the called party indicating that the calling party has agreed to pay the airtime charge.

3. The method of claim 2, further comprising:

supplying a distinguishable signal to the wireless telephone station; and generating one of an audible, visual, and tactile indication at the wireless telephone station in response to the distinguishable signal.

4. The method of claim 3, wherein generating the indication further comprises:

providing one of generating a distinctive ringing pattern, lighting an LED, displaying predetermined characters on a display, and generating a predetermined vibration pattern.

* * * * *